(12) United States Patent
Mehlberg et al.

(10) Patent No.: US 9,283,532 B2
(45) Date of Patent: Mar. 15, 2016

(54) SEGMENTED BAFFLE SYSTEM FOR A RISER

(71) Applicant: UOP LLC, Des Plaines, IL (US)

(72) Inventors: Robert L. Mehlberg, Wheaton, IL (US); Michael S. Sandacz, Glen Ellyn, IL (US)

(73) Assignee: UOP LLC, Des Plaines, IL (US)

( * ) Notice: Subject to any disclaimer, the term of this patent is extended or adjusted under 35 U.S.C. 154(b) by 82 days.

(21) Appl. No.: 13/905,233

(22) Filed: May 30, 2013

(65) Prior Publication Data

US 2014/0356248 A1    Dec. 4, 2014

(51) Int. Cl.
*B01J 8/18*      (2006.01)

(52) U.S. Cl.
CPC .............. *B01J 8/1872* (2013.01); *B01J 8/1845* (2013.01); *B01J 2208/00831* (2013.01)

(58) Field of Classification Search
CPC .............. B01J 2208/00831; B01J 2208/0084; B01J 2219/00777; B01J 8/1845; B01J 8/1863; B01J 8/1872
See application file for complete search history.

(56) References Cited

U.S. PATENT DOCUMENTS

| | | | | |
|---|---|---|---|---|
| 3,353,925 A * | 11/1967 | Baumann et al. | ............. | 422/214 |
| 5,638,890 A * | 6/1997 | Didion et al. | ................. | 164/404 |
| 5,779,989 A | 7/1998 | Tomasicchio et al. | | |
| 5,851,380 A * | 12/1998 | Wells | ............................ | 208/158 |
| 6,109,781 A * | 8/2000 | Ogasawara et al. | ........... | 366/336 |
| 6,126,905 A | 10/2000 | Wells | | |
| 7,658,889 B2 * | 2/2010 | Roux et al. | .................... | 422/145 |
| 7,964,157 B2 | 6/2011 | Dries et al. | | |
| 8,038,950 B2 | 10/2011 | Seidemann et al. | | |
| 8,257,645 B2 * | 9/2012 | Lee et al. | ....................... | 266/283 |
| 2011/0198267 A1 | 8/2011 | Couch et al. | | |
| 2012/0103870 A1 | 5/2012 | Buchanan et al. | | |

\* cited by examiner

*Primary Examiner* — Lessanework Seifu
(74) *Attorney, Agent, or Firm* — James C. Paschall (57) ABSTRACT

According to one aspect of the invention, a riser includes a cylindrical housing defined by a sidewall having an interior surface and an exterior surface. A baffle is defined by a first segment and a second segment, wherein the baffle is designed to be positioned on the interior surface of the riser and wherein the first segment and second segment are releasably interlockable.

9 Claims, 10 Drawing Sheets

SEGMENTED BAFFLE SYSTEM FOR A RISER

CROSS REFERENCE TO RELATED APPLICATIONS

None.

STATEMENT REGARDING FEDERALLY SPONSORED RESEARCH OR DEVELOPMENT

Not applicable

BACKGROUND OF THE DISCLOSURE

1. Field of the Disclosure

This invention relates to a segmented baffle system designed for use in a riser that is used in a fluid catalytic cracking system.

2. Description of the Background of the Disclosure

Fluid catalytic cracking (FCC) is a catalytic hydrocarbon conversion process accomplished by contacting heavier hydrocarbons in a fluidized reaction zone with a catalytic particulate material. The reaction in catalytic cracking, as opposed to hydrocracking, is carried out in the absence of substantial added hydrogen or the consumption of hydrogen. As the cracking reaction proceeds, substantial amounts of highly carbonaceous material referred to as coke are deposited on the catalyst to provide coked or spent catalyst. Vaporous lighter products are separated from spent catalyst in a reactor vessel. Spent catalyst may be subjected to stripping with an inert gas such as steam to strip entrained hydrocarbonaceous gases from the spent catalyst. A high temperature regeneration with oxygen within a regeneration zone operation burns coke from the spent catalyst which may have been stripped. Various products may be produced from such a process, including a naphtha product and/or a light product such as propylene and/or ethylene.

The basic components of the FCC process include an internal or external riser, a reactor vessel in which spent catalyst is disengaged from product vapors, a regenerator, and a catalyst stripper. In the riser, the hydrocarbon feed contacts the catalyst and is cracked into a product stream containing lighter hydrocarbons. A steam or gas stream is used to accelerate catalyst in a first section of the riser before introduction of the feed. Regenerated catalyst and the hydrocarbon feed are transported upwardly in the riser by the expansion of the gases that result from the vaporization of the hydrocarbons, and other fluidizing mediums, upon contact with the hot catalyst.

The structure of an external riser includes a terminal end that is located outside of the reactor vessel. A transport conduit at the end of the riser directs a mixture of product vapors and catalyst into the reactor vessel containing a number of cyclones for separating spent catalyst from the product stream. The transport conduit may exit into a cyclonic separator contained in the reactor to make a first rough separation of catalyst from product vapors. Conventional designs have incorporated a terminal cap at the end of a riser to reverse the flow of the catalyst and cracked product vapors. Such devices are primarily for the purpose of disengaging catalyst particles from the cracked product stream. These conventional designs involve internal risers with terminal ends located in the reactor vessel. The reversed flow mixture of catalyst and product vapors exit an open bottom end of the cap annular to the riser. The catalyst falls downwardly through the open bottom end into a lower catalyst bed while product vapors ascend from the open bottom end into the open volume of the reactor vessel to effect a rough separation.

The velocity of the catalyst as it travels through the riser in the FCC process is particularly important for the realization of operating parameters that are similar to that in an ideal plug flow reactor. Ideally the feed, catalyst, and product vapor mixture may move in a plug flow regime to get the best product selectivity. In a plug flow regime, the catalyst and hydrocarbon vapor are flowing at the same speed up the riser, thereby eliminating back mixing or catalyst slip. Back mixing of the catalyst or slippage in the riser can lead to less selective cracking of the heavy oil to less profitable very light hydrocarbon gas.

In particular, the vapor and catalyst in the riser have slow velocity distributions adjacent the walls of the riser, which indicates a high catalyst holdup and overcracking of the slower moving vapor. Conversely, the vapor and catalyst in the center riser has a fast velocity distribution in the center of the riser, which indicates a low catalyst holdup and underconversion of the faster moving vapor. Therefore, it would be desirable to offer a way to provide a uniform velocity profile for the vapor and catalyst.

One such way to adjust the velocity profile of the catalyst in the desired manner is through the use of one or more baffles. However, implementing baffles in risers in a retrofit situation is particularly problematic in that the existing refractory must be cut and erosion must be controlled downstream of the baffles. Therefore, it would be desirable to provide a way to retrofit risers using a segmented baffle system that does not require substantial reconstruction or repair of the existing riser and protects the riser from eddies.

SUMMARY OF THE INVENTION

According to one aspect of the invention, a conduit includes a cylindrical housing defined by a sidewall having an interior surface and an exterior surface. A baffle is defined by a first segment and a second segment, wherein the baffle is designed to be positioned on the interior surface of the conduit and wherein the first segment and second segment are releasably interlockable. The baffle can include a lower surface characterized by an angle between about 30 to about 50 degrees in relation to the interior surface of the sidewall. The baffle can include an upper surface disposed opposite of the lower surface. The upper surface of the baffle can be characterized by a second angle between about 10 to about 50 degrees in relation to the interior surface of the sidewall. The upper surface of the baffle can be characterized by a radius of curvature. The first segment of the baffle can include a groove. The groove can be disposed at an end thereof. The second segment of the baffle can include a ridge, wherein the ridge of the second segment is designed to be positioned within the groove of the first segment when the baffle is disposed within the conduit.

According to another aspect of the invention, an apparatus for fluid catalytic cracking includes a riser in communication with a reactor vessel and a baffle disposed on an interior surface of the riser. A stripper is in communication with the reactor vessel and a regenerator is in communication with the stripper designed to regenerate catalyst for use in the apparatus. The baffle includes a lower surface characterized by a first angle of about 30 to about 50 degrees in relation to an interior surface of the riser and an upper surface characterized by a second angle of about 10 to about 50 degrees in relation to the interior surface of the riser. The upper surface can optionally be curved to minimize erosive eddies. A ratio of a height dimension of the baffle to an inside diameter dimension of the riser can be between about 2% to about 15%. The baffle can be defined by two discrete segments designed to interact with each other. The segments can interact with each other via a pin. The segments can interact with each other via a ridge and groove relationship.

According to a different aspect of the invention, a method of installing a baffle into a riser comprises the steps of positioning a first segment of a baffle inside of a riser adjacent an interior surface thereof and positioning a second segment of a baffle inside of a riser adjacent the first segment. The first segment and the second segment of the baffle are interlocked and the baffle is secured to the riser. The first segment and the second segment can be interlocked via a pin, and the pin can extend through at least a portion of the riser. The pin may contact both the first and the second segments. The first segment and the second segment can be disposed within a groove in the interior surface of the riser. The first segment and the second segment can be interlocked via a tongue and groove configuration.

These and other features, aspects, and advantages of the present invention will become better understood upon consideration of the following detailed description, drawings and appended claims.

DETAILED DESCRIPTION OF THE DRAWINGS

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives and fall within the scope of embodiments of the invention.

This invention relates to any fluid solids flow in a pipe or conduit in which fluid, particularly gas, flow tends to slow relative to the center of the pipe or conduit. Thus, the invention relates to generally to two-phase transport in which fluids drag at the sides. In one non-limiting embodiment, this invention relates to improved risers for use in an FCC process, and to the improved FCC process. The process and apparatus of this invention can be used to modify the operation and arrangement of existing FCC units or in the design of newly constructed FCC units.

Figure 1:
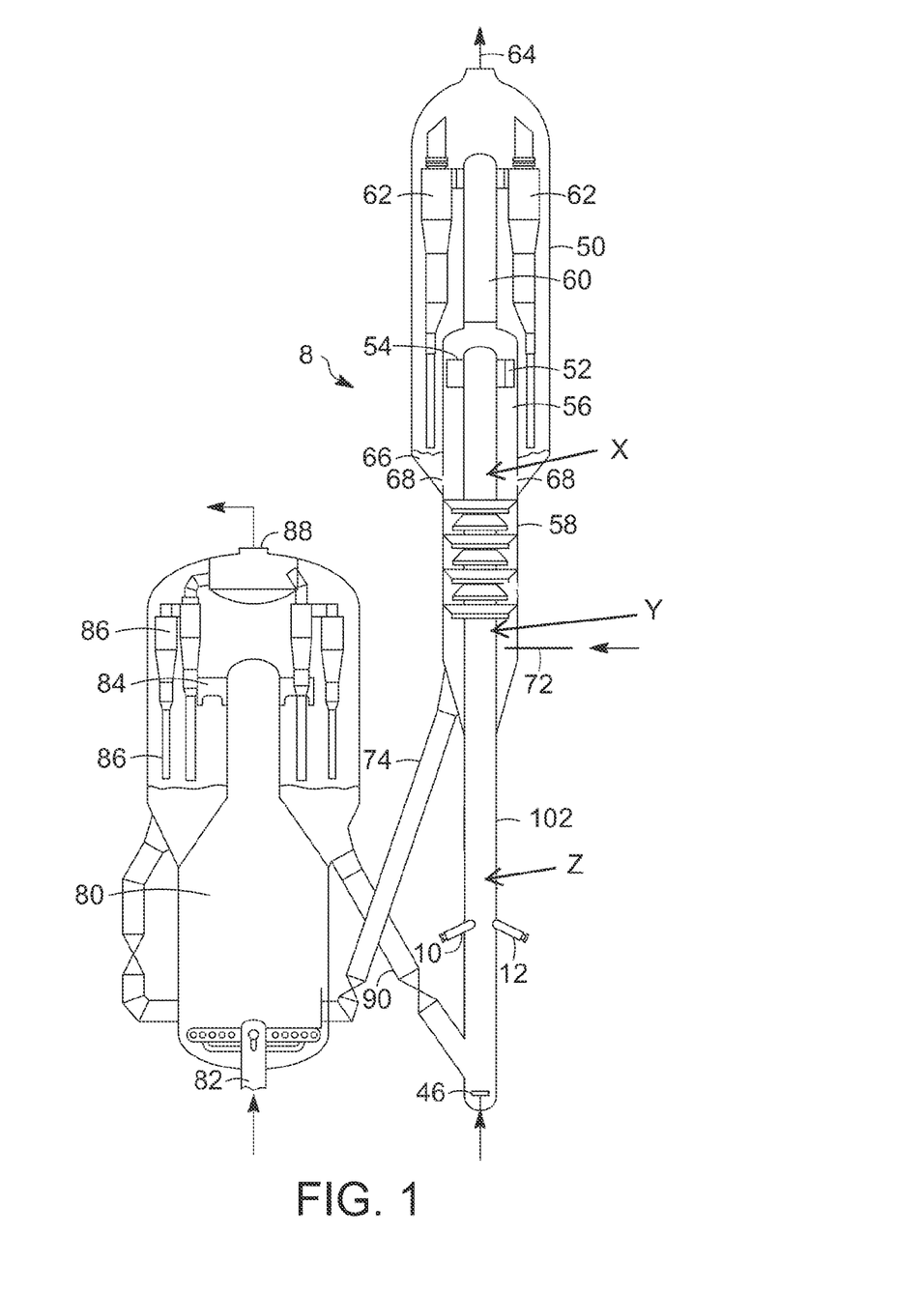
FIG. 1 is a diagrammatic view of one embodiment of a fluid catalytic cracking process that utilizes a riser.

As shown in FIG. 1, an FCC unit 8 may be used in the FCC process. Feedstock may be injected by distributors 10, 12 into the riser 102 where it contacts lift gas and catalyst. The lift gas may include inert gas such as steam distributed by lift gas distributor 46. In general, feedstock may be cracked in the riser 102 in the presence of catalyst to form a cracked stream. Distributors 10, 12 may be located at different radial positions to improve feedstock distribution in the riser 102 and mixing with catalyst.

As shown in FIG. 1, the injected feed mixes with a fluidized bed of catalyst and moves up the riser 102 and enters the reactor 50. In the reactor 50, the blended catalyst and reacted feed vapors are then discharged from the top of the riser 102 through the riser outlet 52 and separated into a cracked product vapor stream and a collection of catalyst particles covered with substantial quantities of coke and generally referred to as "coked catalyst." A swirl arm arrangement 54, provided at the end of the riser 102, may further enhance initial catalyst and cracked hydrocarbon separation by imparting a tangential velocity to the exiting catalyst and cracked product vapor stream mixture. The swirl arm arrangement 54 is located in an upper portion of a separation chamber 56, and a stripping zone 58 is situated in the lower portion of the separation chamber 56. Catalyst separated by the swirl arm arrangement 54 drops down into the stripping zone 58.

The cracked product vapor stream comprising cracked hydrocarbons including naphtha and some catalyst may exit the separation chamber 56 via a gas conduit 60 in communication with cyclones 62. The cyclones 62 may remove remaining catalyst particles from the product vapor stream to reduce particle concentrations to very low levels. Catalyst separated by the cyclones 62 returns to the reactor 50 through diplegs into a dense bed 66 where catalyst will pass through chamber openings 68 and enter the stripping zone 58. The stripping zone 58 removes adsorbed and entrained hydrocarbons from the catalyst by counter-current contact with steam. Steam may enter the stripping zone 58 through a line 72. A coked catalyst conduit 74 transfers coked catalyst to a regenerator 80. The product vapor stream may exit the top of the reactor vessel through a product outlet 64.

As shown in FIG. 1, the regenerator 80 receives the coked catalyst and typically combusts the coke from the surface of the catalyst particles by contact with an oxygen-containing gas. The oxygen-containing gas enters the bottom of the regenerator 80 via a regenerator distributor 82. Flue gas passes upwardly through the regenerator 80. A primary separator, such as a tee disengager 84, initially separates catalyst from flue gas. Regenerator cyclones 86, or other means, remove entrained catalyst particles from the rising flue gas before the flue gas exits the vessel through an outlet 88. Combustion of coke from the catalyst particles raises the temperatures of the catalyst. The catalyst may pass, regulated by a control valve, through a regenerator standpipe 90 which communicates with the bottom portion of riser 102.

In the FCC process, a lift gas such as steam may be passed into the riser 102 to contact and lift the catalyst in the in the riser 102 to the feed point. Regenerated catalyst from the regenerator standpipe 90 will usually have a temperature in a range from about 649° C. and about 760° C. The dry air rate to the regenerator may be between about 3.6 and about 6.3 kg/kg coke. The hydrogen in coke may be between about 4 and about 8 wt. %, and the sulfur in coke may be between about 0.6 and about 3.0 wt. %. Catalyst coolers on the regenerator may be used. Additionally, the regenerator may be operated under partial CO combustion conditions. Moreover, water or light cycle oil may be added to the bottom of the riser to maintain the appropriate temperature range in FCC unit. Conversion is defined by conversion to gasoline and lighter products with 90 vol. % of the gasoline product boiling at or below 193° C. using ASTM D-86. The conversion may be between about 55 and about 90 vol. % as produced.

The riser 102 may operate in a temperature range of between about 427° C. and 649° C., preferably between about 482° C. and about 593° C. The pressure in the riser 102 may be between about 103 and about 241 kPa (gauge), preferably between about 120 and about 160 kPa (gauge).

Figure 2:
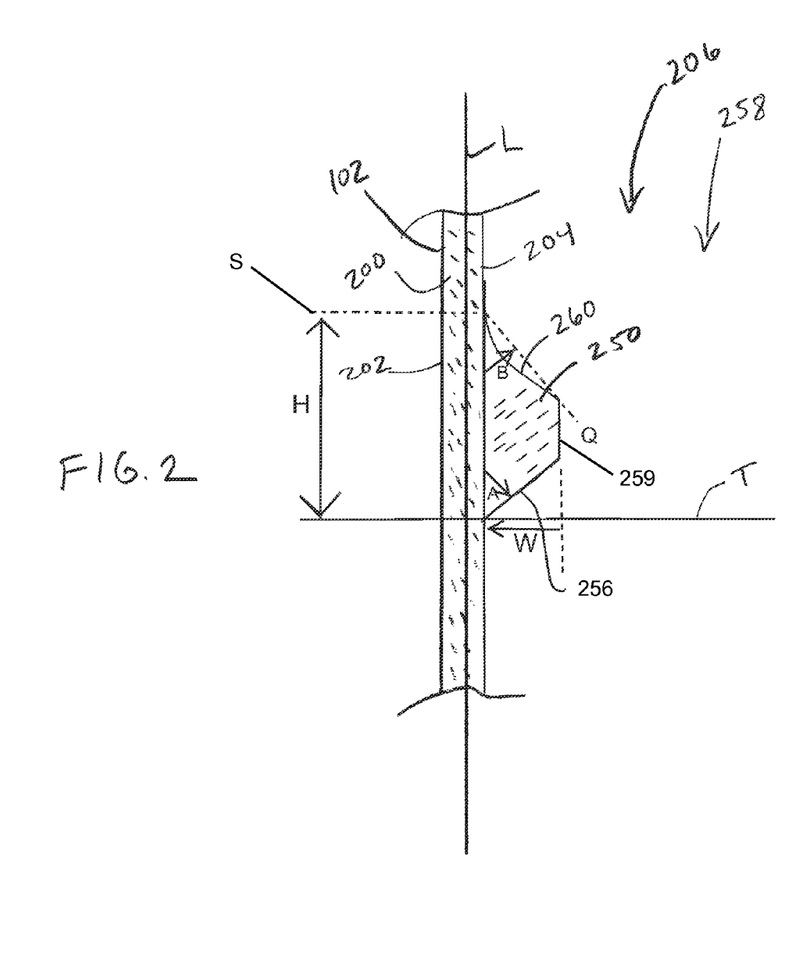
FIG. 2 is a partial cross-sectional view of a baffle for use in the riser of FIG. 1.
Figure 3:
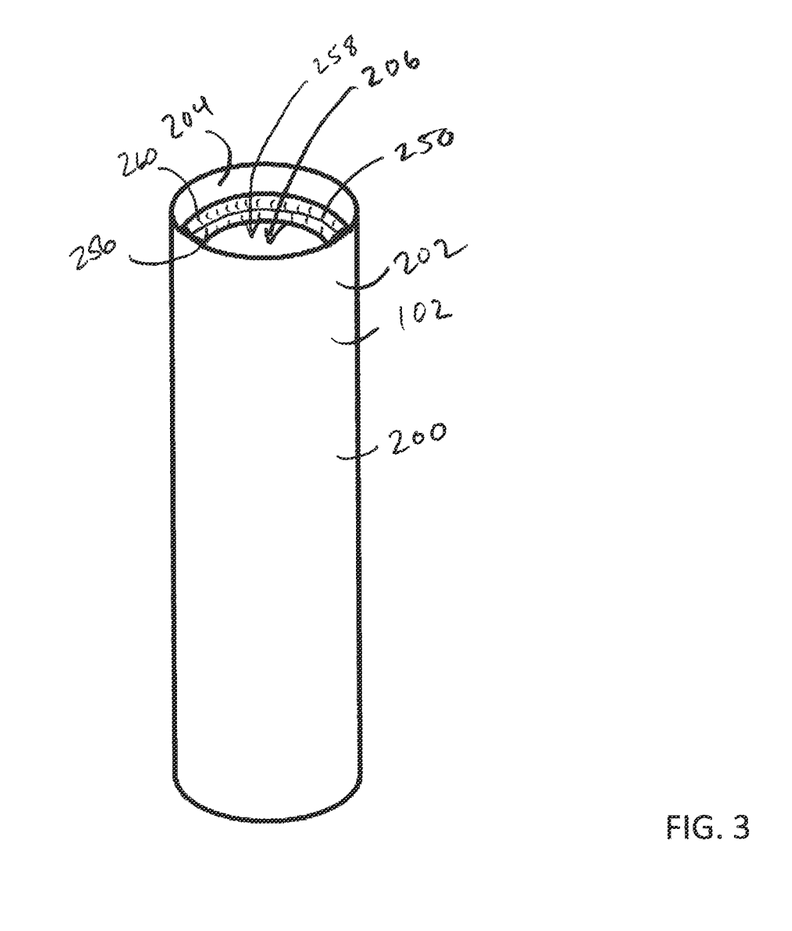
FIG. 3 is an isometric view of a riser for use in a fluid catalytic cracking system having a baffle disposed therein.
Figure 4:
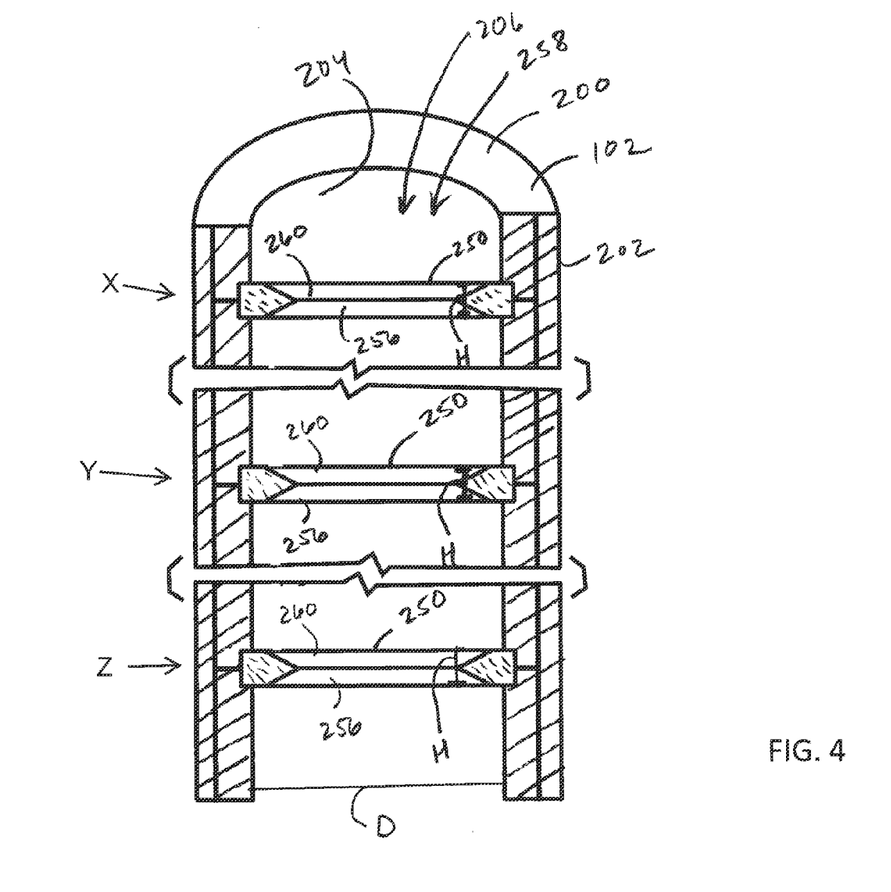
FIG. 4 is a partial cross-sectional view of the riser of FIG. 3 including a plurality of baffles disposed therein.
Figure 5:
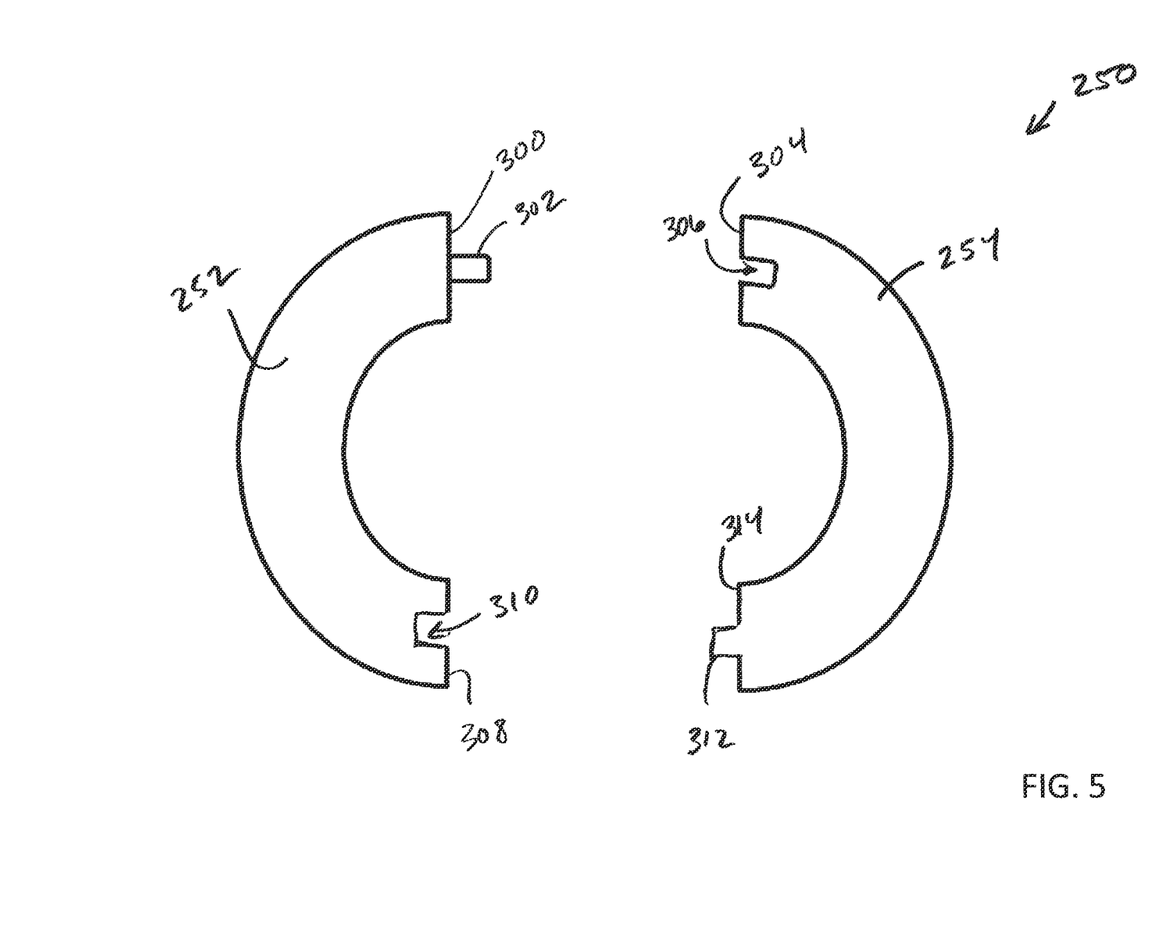
FIG. 5 is a top elevational view of an embodiment of a baffle having a first and a second segment for use in a riser.

Now referring to FIGS. 2-4, the riser 102 is defined by a cylindrical housing 200 having an exterior surface 202 and an interior surface 204 related thereto. The riser 102 includes a length dimension L that is between about 21.3 meters (70 feet) to about 45.7 meters (150 feet). In a different embodiment, the length dimension L is between about 24.4 meters (80 feet) to about 36.6 meters (120 feet). It should be appreciated that the length of the riser 102 may be adjusted as desired. The riser 102 further includes an end cap (not shown) on one or more ends to enclose the riser and form a chamber 206 therein. The chamber 206 is designed to accommodate a hydrocarbon feed (not shown) as it contacts a catalyst (not shown) and is cracked into a product stream (not shown) containing lighter hydrocarbons. The catalyst and the hydrocarbon feed are transported upwardly in the riser 102 by the expansion of the gases that result from the vaporization and cracking of the hydrocarbons, and other fluidizing mediums, upon contact with the hot catalyst.

The temperature in the riser 102 may be between about 454° C. and about 593° C. (between about 850° F. and about 1100° F.), preferably between about 482° C. and about 566° C. (between about 900° F. and about 1050° F.), and more preferably between about 510° C. and about 566° C. (between about 950° F. and about 1050° F.).

FCC risers 102 may be revamped in accordance with the parameters described hereinbelow to make the riser gas and catalyst velocity profiles more uniform and more closely approach the velocity profiles in an ideal plug flow reactor. Further, new risers 102 may be manufactured or otherwise made to incorporate the additional materials as described herein.

As best seen in FIGS. 2-10, one or more baffles 250 are preferably incorporated into the riser 102. The baffles 250 comprise one or more interlocking segments 252, 254 designed to interact with each other. The baffles 250 are designed to be installed in an existing riser 102, or may be incorporated into a new riser 102 in the manners described herein.

The baffles 250 each preferably include a lower surface 256 that is downwardly angled at an angle A (see FIG. 2) between the interior surface 204 of the riser 102 and the lower surface 256. In one embodiment, the angle A is between about 30 degrees to about 50 degrees. In a different embodiment, the angle A is about 30 to 35 degrees. In a further embodiment, the angle A is between about 35 and 45 degrees. In one particular embodiment, the angle A is between about 40 to 50 degrees. In a further embodiment, the angle A is between about 45 to 50 degrees.

The angling of the lower surface 256 is designed in a manner that disrupts the flow of the catalyst along the interior surface 204 of the riser 102. When the catalyst contacts the lower surface 256 of the baffle 100, the catalyst re-disperses toward a center section 258 of the riser 102 resulting in a more uniform velocity and density profile within the riser and plug flow.

Each baffle 250 further includes an upper surface 260 disposed opposite the lower surface 256. Each baffle 250 further includes a generally vertical section 259 between the upper surface 260 and the lower surface 256. In other forms, the vertical section 259 may omitted such that the upper surface 260 and the lower surface 256 join at a line (see FIG. 4), or the upper surface 260 and the lower surface 256 may join at a curved convex surface relative to the interior surface 204 of the riser 102.

The upper surface 260 of the baffle 250 is designed to protect the riser 102 from erosive eddies of the vena contracta caused by the baffle 250. The baffles 250 each preferably include upper surface 260 that is upwardly angled at an angle B (see FIG. 2) between the interior surface 204 of the riser 102 and the reference line Q of FIG. 2. In one embodiment, the angle B is between about 10 degrees to about 50 degrees. In a different embodiment, the angle B is about 20 to 40 degrees. In a further embodiment, the angle B is between about 10 and 30 degrees. In one particular embodiment, the angle B is between about 10 to 20 degrees. In a further embodiment, the angle A is between about 10 to 25 degrees. The upper surface 260 is optionally defined by a concave upward curvature relative to reference line Q perhaps providing a smooth contour as shown in FIG. 2. However, the upper surface 260 may have a surface in the shape of line Q of FIG. 2.

Each baffle 250 preferably has a specific height dimension H as determined in relation to a line S tangent to a top of the baffle 250 and a line T tangent to a bottom of the baffle 250 (see FIGS. 2 and 4). For example, the height dimension H is preferably between about 0.13 meters (5 inches) to about 1.22 meters (4 feet). In one embodiment, the height dimension H is preferably between about 0.30 meters (1 foot) to about 0.91 meters (3 feet).

The inside diameter dimension D of the riser 102 (see FIG. 4) is preferably between about 0.91 meters (3 feet) to about 4.27 meters (14 feet). In one embodiment, the diameter dimension D of the riser 102 is preferably between about 1.83 meters (6 feet) to about 3.66 meters (12 feet). In a different embodiment, the diameter dimension D of the riser 102 is preferably between about 2.13 meters (7 feet) to about 3.05 meters (10 feet). In one particular embodiment the diameter dimension D of the riser 102 is 2.74 meters (9 feet).

The ratio of the height dimension H of the baffle 250 to the diameter dimension D of the riser 102 can be between about 2% to about 15%, more preferably between about 3% to about 7%, and most preferably between about 4% and about 5%. In one particular embodiment, the ratio of the height dimension H of the baffle 250 to the diameter dimension D of the riser 102 is 3%. In a different embodiment, the ratio of the height dimension H of the baffle 250 to the diameter dimension D of the riser 102 is 4%. In a further embodiment, the ratio of the height dimension H of the baffle 250 to the diameter dimension D of the riser 102 is 5%.

Each baffle 250 has a specific radial width dimension W (see FIG. 2). For example, width dimension W is preferably between about 0.08 meters (3 inches) to about 0.51 meters (20 inches), or more preferably 0.13 meters (5 inches) to about 0.38 meters (15 inches). The ratio of width dimension W to the outside diameter of the baffle 250 may be 0.1:1 to 0.4:1.

The baffles 250 are preferably made of ceramic. In one particular embodiment, the baffles 250 are made from a mixture of ceramic materials. In a different embodiment, the baffles 250 are made from other materials as known in the art.

The baffles 250 are designed to be positioned on the interior surface 204 of the riser 102. To retrofit an existing riser 102, the baffles 250 may be incorporated into the riser 102 in numerous ways. As best seen in the non-limiting example of FIG. 5, one or more segments 252, 254 may be interlocked in a tongue and groove manner. In particular, a first end 300 of segment 252 includes a ridge 302 protruding outwardly therefrom. A first end 304 of segment 254 includes a groove 306 provided in a shape adapted to accommodate the corresponding ridge 302. The ridge 302 may be slid into the groove 306 to securely interlock the segments 252, 254. The ridge 302 and/or groove 306 may be positioned along other portions of the baffle 250 to effectuate the coupling of segments 252, 254. Similarly, a second end 308 of segment 252 includes a groove 310 provided in a shape to accommodate a corresponding ridge 312. A second end 314 of the segment 254 includes the corresponding ridge 312.

Figure 6:
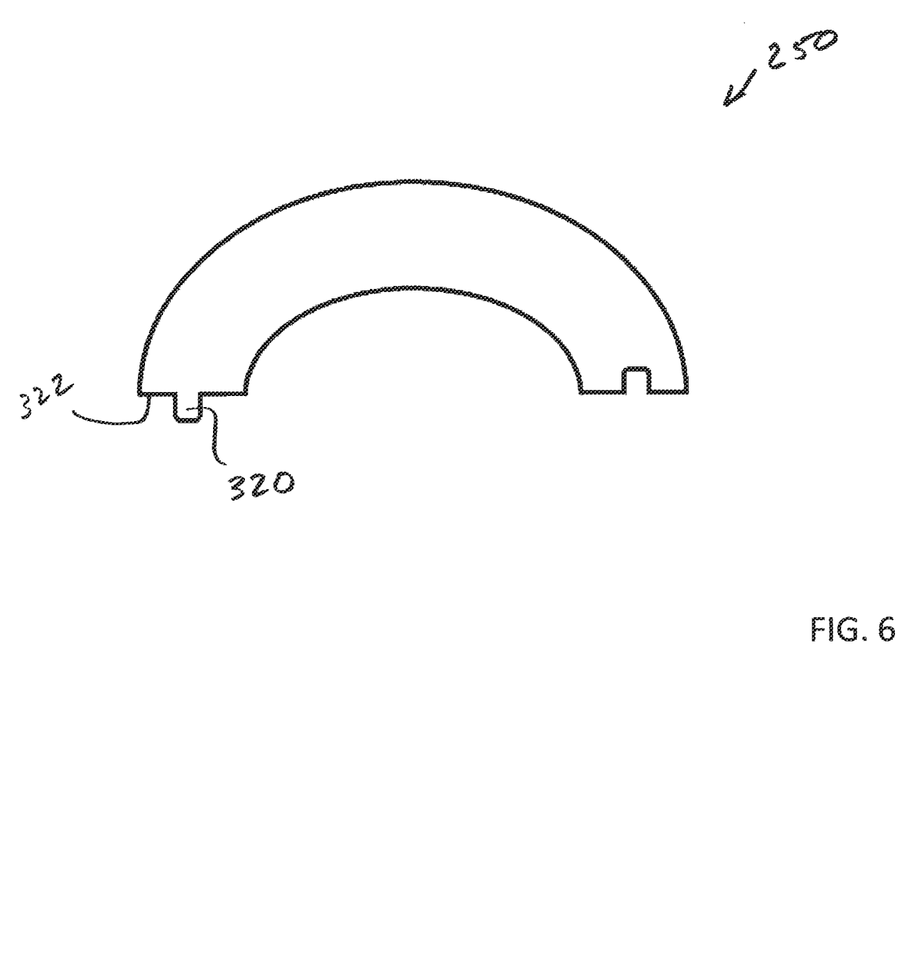
FIG. 6 is a top elevational view of a different embodiment of the baffle of FIG. 5.
Figure 7:
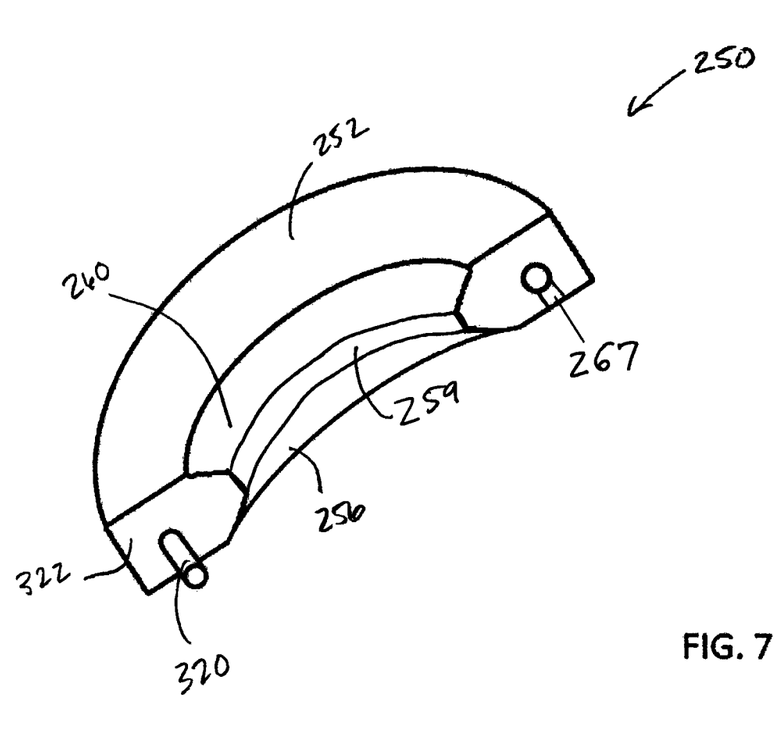
FIG. 7 is an isometric view of another embodiment of a baffle for use in a riser.
Figure 8:
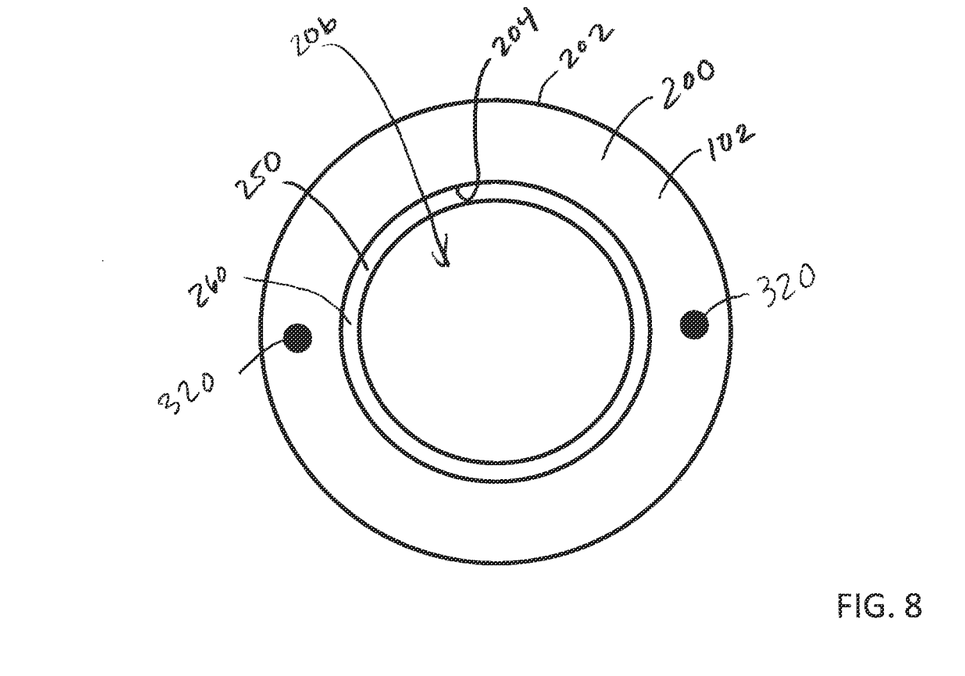
FIG. 8 is a top elevational view of a different embodiment of a baffle having one or more pins, wherein the baffle is similar to the baffle of FIG. 7

In a different non-limiting embodiment depicted in FIGS. 6 and 7, a pin 320 is utilized in conjunction with the baffle 250. The pin 320 is preferably made of metal, ceramic, or the like. In one particular embodiment, the pin 320 is made of a metal having a low melting point with a higher coefficient of thermal expansion such as stainless steel. Metals having a higher coefficient of thermal expansion tightens the baffle 250 formed by the segments 252, 254. In one embodiment, the pin 320 extends from an end 322 of segment 252 and is designed to be received in a corresponding opening in an end of segment 304. A slot 267 (see FIG. 7) provides clearance for the pin 320. In a different embodiment, one or more pins 320 may also extend through portions of the riser 102 as shown in FIG. 8.

Figure 9:
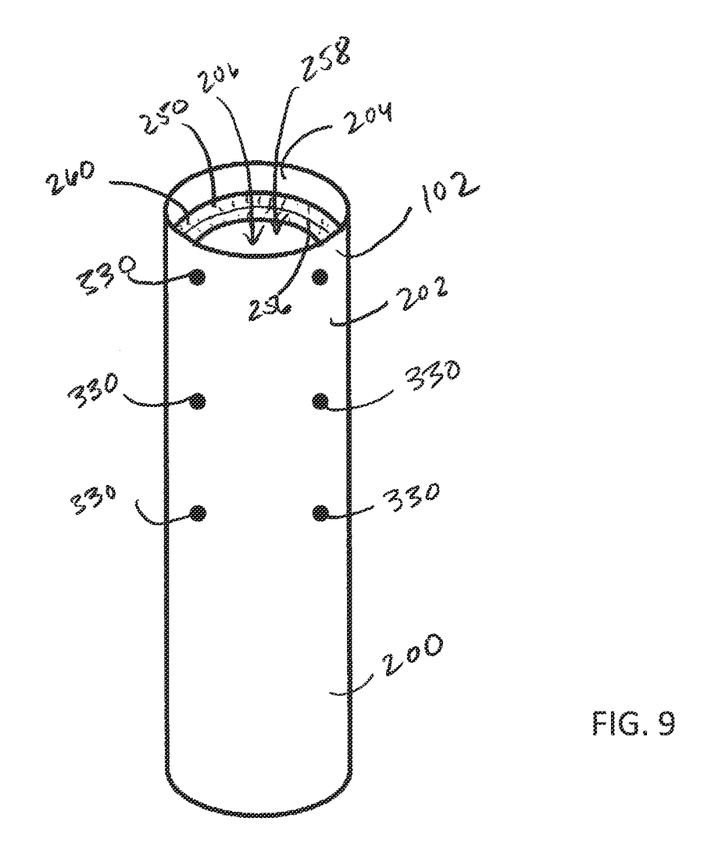
FIG. 9 is an isometric view of another embodiment of a plurality of baffles disposed in a riser, wherein the baffles are attached to the riser via a plurality of pins.

In a further non-limiting embodiment shown in FIG. 9, one or more pins 330 are designed to extend into the riser 102 and interact with the baffle 250 along the circumference thereof. The pins 330 may protrude from a rear surface of the baffle 250 and may be at least partially embedded into the interior surface 204 of the riser 102. Alternatively, the pins 330 may optionally be inserted into the baffle 250 through a hole (not shown) formed in the external surface 206 of the riser 102. Any number of pins 330 may be inserted that are sufficient to secure the baffle 250 to the interior surface 204 of the riser 102. The pins 330 are preferably metal, ceramic, or the like. The pins 330 are preferably made of metal, ceramic, or the like. In one particular embodiment, the pins 330 are made of a metal having a low melting point with a higher coefficient of thermal expansion such as stainless steel.

Figure 10:
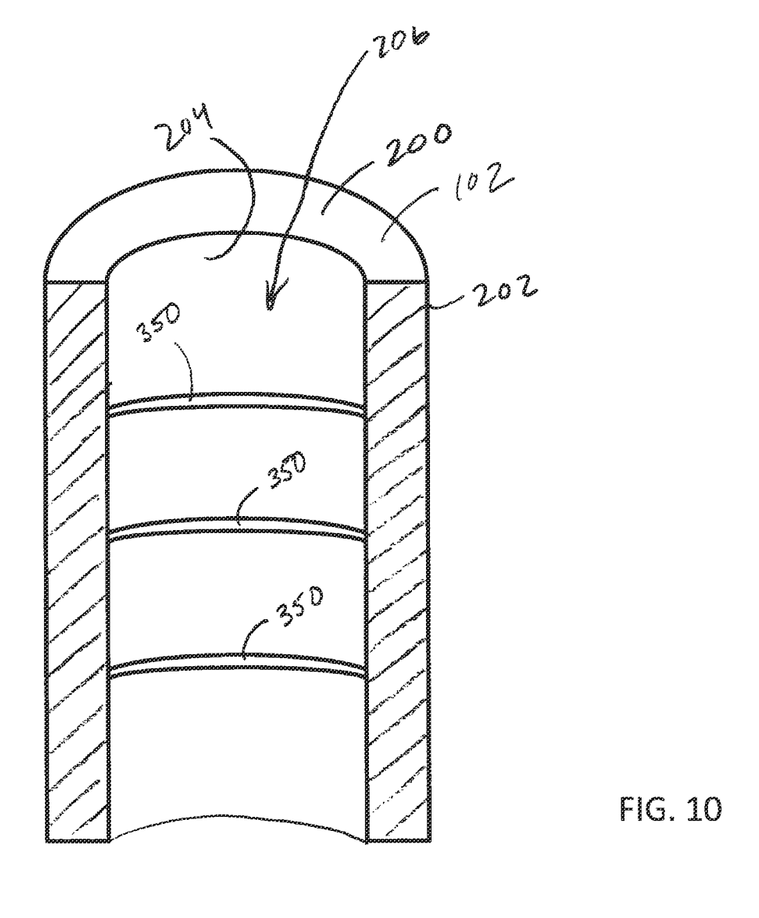
FIG. 10 is partial cross-sectional view of another embodiment of a riser designed to be utilized with the baffles described herein.

As depicted in FIG. 10, in another embodiment, one or more grooves 350 are cut into the interior surface 204 of the riser 102 and are designed to receive the baffle 250. The grooves 350 may be cut into a portion of the interior surface 204, or may extend through the entirety of the housing 200.

The baffles 250 may be incorporated into the riser 102 using one or more of the methods disclosed herein, alone or in conjunction with each other. For example, the baffles 250 may be incorporated into the riser 102 using a pin and using a ridge/groove. In a different embodiment, pins may be used in the baffles 250 and through the housing 200. Still further, the baffles 250 may be secured to the housing 200 in other manners in accordance with the description herein.

The riser 102 preferably includes one or more baffles 250 according to the parameters discussed herein. In one embodiment, the riser 102 includes between one to about twenty baffles 250. In a different embodiment, the riser 102 includes two to three baffles 250. In one particular embodiment, the riser 102 includes three baffles 250. In a different embodiment, the riser 102 includes two baffles 250. In a further embodiment, the riser 102 includes one baffle 250.

While the foregoing written description of the invention enables one of ordinary skill to make and use the invention, those of ordinary skill will understand and appreciate the existence of variations, combinations, and equivalents of the specific exemplary embodiments thereof. The invention is therefore to be limited not by the exemplary embodiments herein, but by all embodiments within the scope and spirit of the appended claims.

We claim:

1. A conduit, comprising:
    a cylindrical housing defined by a sidewall having an interior surface and an exterior surface;
    a baffle defined by a first segment and a second segment, wherein the baffle is designed to be retrofitted and positioned on the interior surface of the conduit on top of a refractory layer and wherein the first segment and second segment are releasably interlockable; and
    wherein the baffle includes a lower surface characterized by an angle in relation to the interior surface of the sidewall, and wherein the baffle is designed to be sealingly flush with the interior surface of the cylindrical housing or to be disposed within a groove disposed in the interior surface of the sidewall.

2. The conduit of claim 1, wherein the lower surface is characterized by an angle between about 30 to about 50 degrees in relation to the interior surface of the sidewall.

3. The conduit of claim 1, wherein the baffle includes an upper surface disposed opposite of the lower surface.

4. The conduit of claim 3, wherein the upper surface is characterized by a second angle between about 10 to about 50 degrees in relation to the interior surface of the sidewall.

5. The conduit of claim 4, wherein the upper surface is characterized by a radius of curvature.

6. The conduit of claim 1, wherein the first segment of the baffle includes a groove.

7. The conduit of claim 6, wherein the groove is disposed at an end thereof.

8. The conduit of claim 7, wherein the second segment of the baffle includes a ridge.

9. The conduit of claim 8, wherein the ridge of the second segment is designed to be positioned within the groove of the first segment when the baffle is disposed within the conduit.

* * * * *